(12) United States Patent
Ehrenleitner (10) Patent No.: US 10,808,817 B2
(45) Date of Patent: Oct. 20, 2020

(54) DEVICE FOR PIVOTING AN OBJECT ABOUT A VIRTUAL AXIS

(71) Applicant: EB-invent GmbH, Altensteig-Walddorf (DE)

(72) Inventor: Franz Ehrenleitner, Aitensteig-Walddorf (DE)

(73) Assignee: EB-INVENT GMBH (DE)

( * ) Notice: Subject to any disclaimer, the term of this patent is extended or adjusted under 35 U.S.C. 154(b) by 99 days.

(21) Appl. No.: 16/013,823

(22) Filed: Jun. 20, 2018

(65) Prior Publication Data

US 2018/0372201 A1 Dec. 27, 2018

(30) Foreign Application Priority Data

Jun. 26, 2017 (DE) .......................... 10 2017 114 148

(51) Int. Cl.
| | |
|---|---|
| *F16H 37/12* | (2006.01) |
| *F16H 21/44* | (2006.01) |
| *F16H 19/00* | (2006.01) |
| *B60N 2/10* | (2006.01) |
| *A47C 3/025* | (2006.01) |
| *A47C 17/04* | (2006.01) |
| *A47L 9/02* | (2006.01) |
| *A47C 3/18* | (2006.01) |

(52) U.S. Cl.
CPC .............. *F16H 37/12* (2013.01); *B60N 2/10* (2013.01); *F16H 19/005* (2013.01); *F16H 21/44* (2013.01); *A47C 3/0255* (2013.01); *A47C 3/18* (2013.01); *A47C 17/04* (2013.01); *A47L 9/02* (2013.01)

(58) Field of Classification Search
CPC ........ F16H 19/005; F16H 21/44; F16H 37/12; B60N 2/10; B60N 2/14; B60N 2/22; A47C 3/18; A47C 17/04; A47C 3/0255; A61G 7/05; A61G 13/02; B25J 11/00; B25J 17/0266; B25J 18/007; A47D 9/02
See application file for complete search history.

(56) References Cited

U.S. PATENT DOCUMENTS

| | | |
|---|---|---|
| 3,141,669 A | 7/1964 | Chul |
| 4,798,361 A | 1/1989 | Fawcett |
| 4,799,667 A | 1/1989 | Suchy |
| 4,824,099 A | 4/1989 | Rusu et al. |

(Continued)

FOREIGN PATENT DOCUMENTS

| | | | | |
|---|---|---|---|---|
| DE | 102012212342 A1 * | 1/2014 | .............. | E02F 3/437 |
| DE | 102012212345 A1 * | 1/2014 | ............ | B25J 9/1065 |

(Continued)

*Primary Examiner* — Adam D Rogers
(74) *Attorney, Agent, or Firm* — Raven Patents, LLC (57) ABSTRACT

A device for pivoting an object about a virtual axis by means of a kinematic system having a fixed base on which there is rotatably supported a first rotary component which has a first coupling component which rotates with respect to the base not in accordance with the rotary component, preferably not at all, characterized in that a second rotary component, constructed in a similar manner to the first, is connected to the first rotary component by means of the coupling components, whereby the portion thereof which in the case of the first rotary component corresponds to the base and which in this instance is the object carrier is rotated about the virtual axis.

10 Claims, 14 Drawing Sheets

(56) References Cited

U.S. PATENT DOCUMENTS

| | | | |
|---|---|---|---|
| 4,852,943 | A | 8/1989 | Roper |
| 5,342,244 | A | 8/1994 | Nelson |
| 5,409,295 | A | 4/1995 | Edstrom |
| 5,588,704 | A | 12/1996 | Harza |
| 5,759,107 | A | 6/1998 | Nagel |
| 5,769,492 | A | 6/1998 | Jensen |
| 6,331,152 | B1 | 12/2001 | Holle |
| 6,988,951 | B1 | 1/2006 | Newman et al. |
| 8,100,476 | B2 | 1/2012 | Jenkins |
| 8,303,238 | B2 * | 11/2012 | Thurneysen ......... B23Q 1/4852 414/680 |
| 8,579,714 | B2 | 11/2013 | Trui et al. |
| 9,968,196 | B2 | 5/2018 | Ehrenleitner |
| 2008/0114560 | A1 | 5/2008 | Jonas |
| 2008/0191525 | A1 | 8/2008 | Jensen et al. |
| 2014/0001318 | A1 | 1/2014 | Ehrenleitner |
| 2014/0132051 | A1 | 5/2014 | Freedman |
| 2016/0311536 | A1 | 10/2016 | Schultheis et al. |
| 2016/0360889 | A1 | 12/2016 | Matlin et al. |

FOREIGN PATENT DOCUMENTS

| | | | |
|---|---|---|---|
| DE | 102014012160 A1 | 2/2016 | |
| FR | 2965207 A1 * | 3/2012 | ........... B23Q 1/5456 |
| WO | 2012123102 A1 | 9/2012 | |
| WO | 2013029069 A1 | 3/2013 | |

\* cited by examiner

DEVICE FOR PIVOTING AN OBJECT ABOUT A VIRTUAL AXIS

BACKGROUND

The invention relates to a device having a planar kinematic system which enables an object to be pivoted about a fixed axis which is not constructed in a physical manner, a so-called virtual axis, in accordance with the present disclosure and DE 10 2014 012 160 A1.

Figure 3:
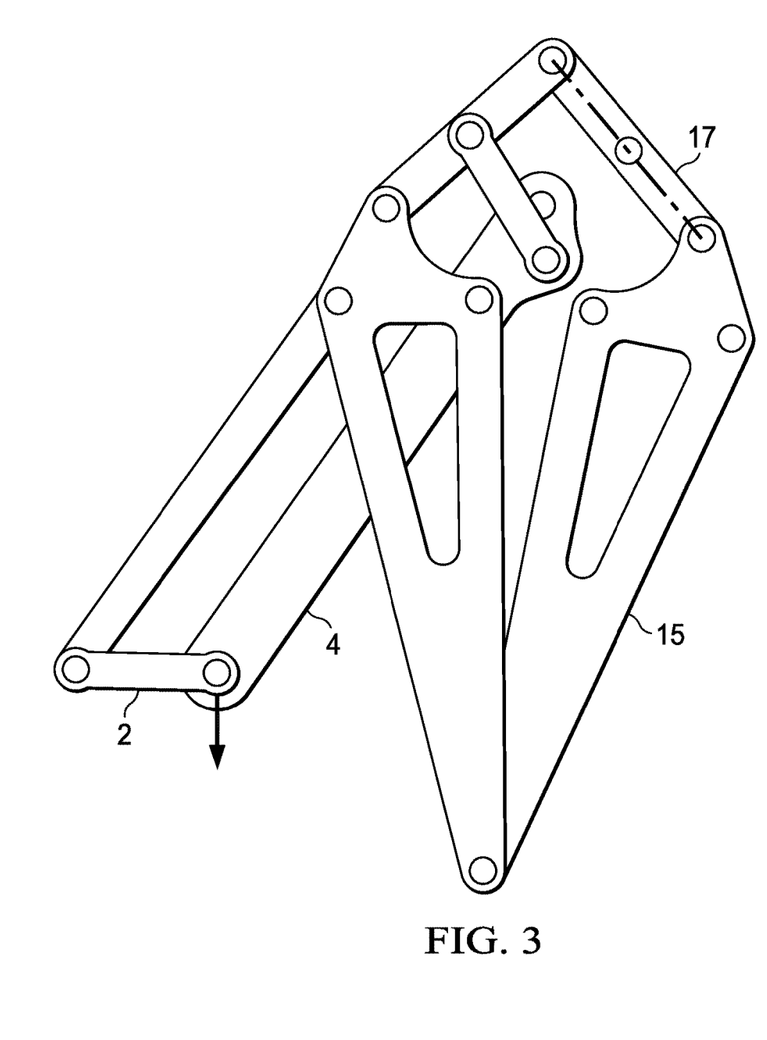

In this publication of the Applicant, such a planar kinematic system is illustrated in FIG. 3 and explained in the description: there is pivotably fitted about a fixed axis a first arm on whose end a second arm can be pivoted about an axis which is parallel with the first axis and which carries at the end thereof in turn a third arm in a manner pivotable about a parallel axis. On the third arm, a tool carrier or the object which is intended to be rotated is mounted, the angular positions of the axes are, for example, linked to each other by means of flexible wrap-around means, such as bands, chains, cables in such a manner that the three axes always assume the form of a parallelogram. In this manner, the tool carrier or object always pivots about the virtual axis which in the parallelogram corresponds to the fourth corner location. This construction is simple and if the angles do not become excessively small or large (at adjacent corner locations, this kinematic system can also be controlled in terms of the forces which occur, but it always has the unavoidable disadvantage in comparison with the pivot range available of requiring a large amount of space and, as a result of this extent, also having to be constructed in a solid and heavy manner.

Another kinematic system is known from WO2013/029069 of the Applicant. In this instance, two articulated parallelograms are connected by means of a four-bar linkage, wherein the outermost, aligned sides of a parallelograms in each case and the quadrilateral which is arranged in the narrowed portion are constructed and arranged in a continuously rigid manner. This device also requires a large amount of space but has the advantage in angular positions which are not too extended of being extremely stable without being constructed in a heavy manner, but the extended angular positions can also hardly be controlled in this instance.

From WO2012/0123102 and US2014/0001318 by the same Applicant (each of which is hereby incorporated by reference), a pivot device for an object about a virtual axis on the basis of completely different considerations is known: there are provided two spatial kinematic systems which each comprise three arms which, in a state arranged one behind the other, are connected to each other in an articulated manner, wherein the three articulation axes each intersect at a point. Since two such devices are provided and the object or the object carrier is secured to the third arm which is common to both devices, this moves about the virtual straight connection line of the two virtual intersections. This device is stable and enables large pivot angles, but requires a relatively large amount of space and therefore can only be used with difficulty in particular with limited spatial relationships.

There is consequently a requirement for a kinematic system which enables objects which can be pivoted about a virtual axis to be guided in a simple, stable and reliable manner, even when only little space is available and when large angular ranges have to be covered.

SUMMARY

An object of the invention is to provide such a kinematic system.

According to the invention this object is achieved with a kinematic system which has the features set out in the present disclosure. That is to say, there is rotatably supported on a base a first rotary component which has a coupling component which rotates with respect to the base not in accordance with the rotary component, preferably not at all. A second rotary component which is constructed in a similar manner is connected to the first rotary component by means of the coupling components, whereby the portion thereof which in the case of the first rotary component corresponds to the base and which in this instance is referred to as an object carrier rotates about the virtual axis.

The kinematic system is a planar kinematic system, all the axes thereof extend parallel with each other and with the virtual axis, but also includes the particular case in which all the axes already intersect in a finite manner at a point, the central point, and thus provide a spherical kinematic system in which the virtual axis also extends through the central point. From a kinematic viewpoint, these two cases are equivalent.

In the first embodiment, the rotary components are four-link levers which are connected to each other in an articulated manner by means of the couplers thereof. In an embodiment, this is carried out by means of a coupling mechanism, wherein the coupling mechanism engages in each case on the two (adjacent) links of the two couplers of the four-link lever (also referred to as four-bar linkages).

In advantageous embodiments, the four-link levers are articulated parallelograms and/or the coupling mechanism comprises a rotatable connection of the extension of one side of the four-link levers and the rotatable connection of the bent extension of the two couplers of the four-link lever. Other coupling mechanisms are explained below.

The construction of the overall kinematic system is preferably at least substantially symmetrical, but it is completely possible and with corresponding geometric peripheral conditions also recommended to use asymmetrical embodiments.

In the second embodiment of the invention which is equivalent to the first in kinematic terms, the rotary components are rotating arms which are provided with pulling means or wheel gear mechanisms, the two rotating arms are then connected by means of a coupling mechanism; examples of this are set out in the description of the Figures.

The term "kinematic system" is used in the description and the claims for both the theoretical structure of a purely geometric nature and the physical/technical implementation thereof in practice. This means inter alia that in the drawing the construction of bearings, shafts, axes and the arrangement thereof normally with respect to the drawing plane is illustrated in most cases only schematically since this presents no problems for the person skilled in the art with knowledge of the invention and overloading of the illustration is thereby prevented.

The base is occasionally referred to as "fixed", this applies only with respect to the kinematic system considered, the base may also naturally be arranged so as to be able to be displaced on a carriage, a sliding member or the like and/or rotatably secured to a sub-base, not to mention use in a vehicle.

The invention is explained in greater detail below with reference to the drawings and preferred embodiments.

DETAILED DESCRIPTION

Figure 1:
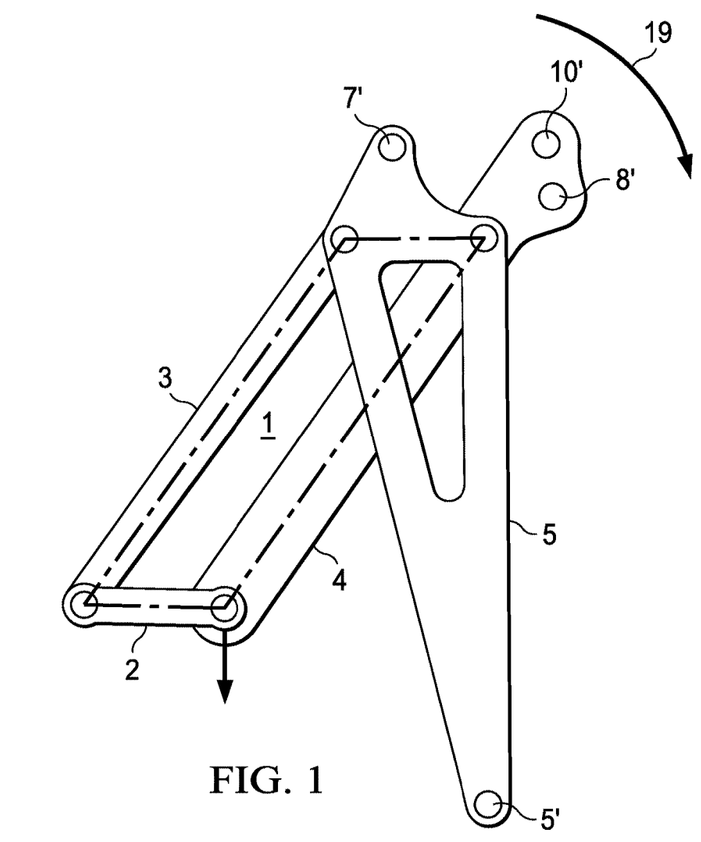
FIGS. 1 to 5 are a step-by-step explanation of a first embodiment of a kinematic system according to the invention.

FIG. 1 shows, with respect to the functionality, the first step of the construction and the operation of a first embodiment of a kinematic system according to the invention: an articulated parallelogram 1 comprising the base 2, which is illustrated for reasons of completeness, a guiding rod 3, a steering rod 4 which extends parallel therewith and a coupling component 5 forms the base-side base of the kinematic system. When pivoted in the direction of the rotational arrow 19 or in the opposite direction, the articulated parallelogram 1 pivots in known manner and the coupling unit 5 carries out a translational movement in which its orientation is always maintained.

Figure 2:
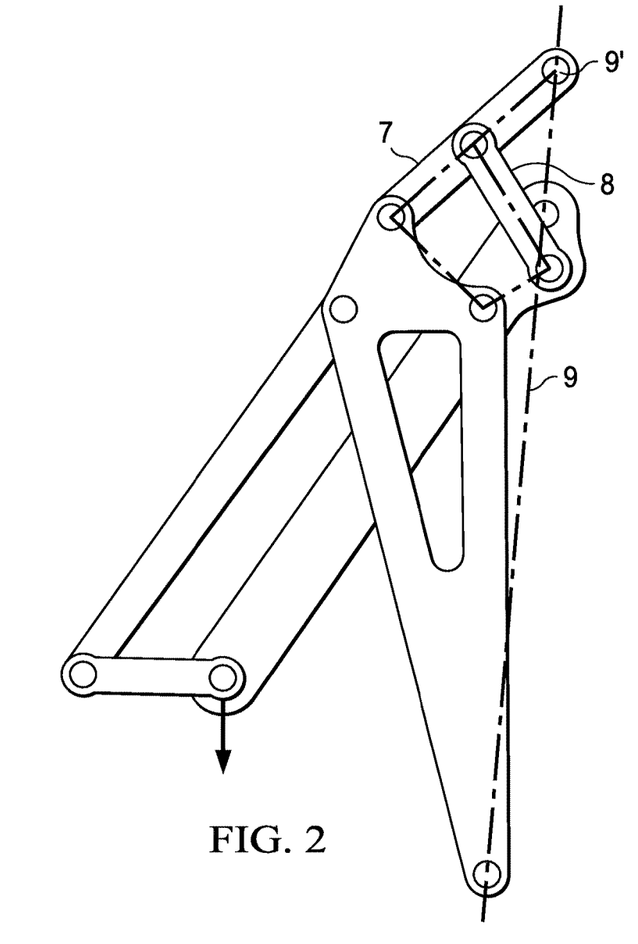

The steering rod 4 is extended beyond the region in which it directly forms the articulated parallelogram 1 and has articulation locations or articulation axes, the coupling unit 5 also has a rotation axis above the region in which it forms the articulated parallelogram 1. On the rotation axis 7' a gear mechanism lever 7 is rotatably provided, as shown in FIG. 2. This gear mechanism lever 7 is guided in its position by means of a connection rod 8 which is supported substantially centrally in an articulated manner on the gear mechanism lever and which is mounted with the other end thereof in the lower bearing 8' of the steering rod. The gear mechanism lever 7 has another bearing axis or a bearing having a bearing axis and in this instance the condition is complied with that the end axis 9', the second bearing axis 10' which is provided on the steering rod 4 and which is called the center axis, and the coupling axis 5' which is provided in the lower region of the coupling unit 5' are located at least substantially on a straight connection line.

For applications of the kinematic system according to the invention, in which the guiding of the object which is intended to be rotated is intended to be carried out in a precise manner which can be precisely precalculated, it is advantageous and in many cases necessary for these three rotation axes to be arranged precisely on a common line g, in other application fields, for example, in seat faces of items of furniture or the like, this is not required, in this instance deviations are readily possible.

Figure 4:
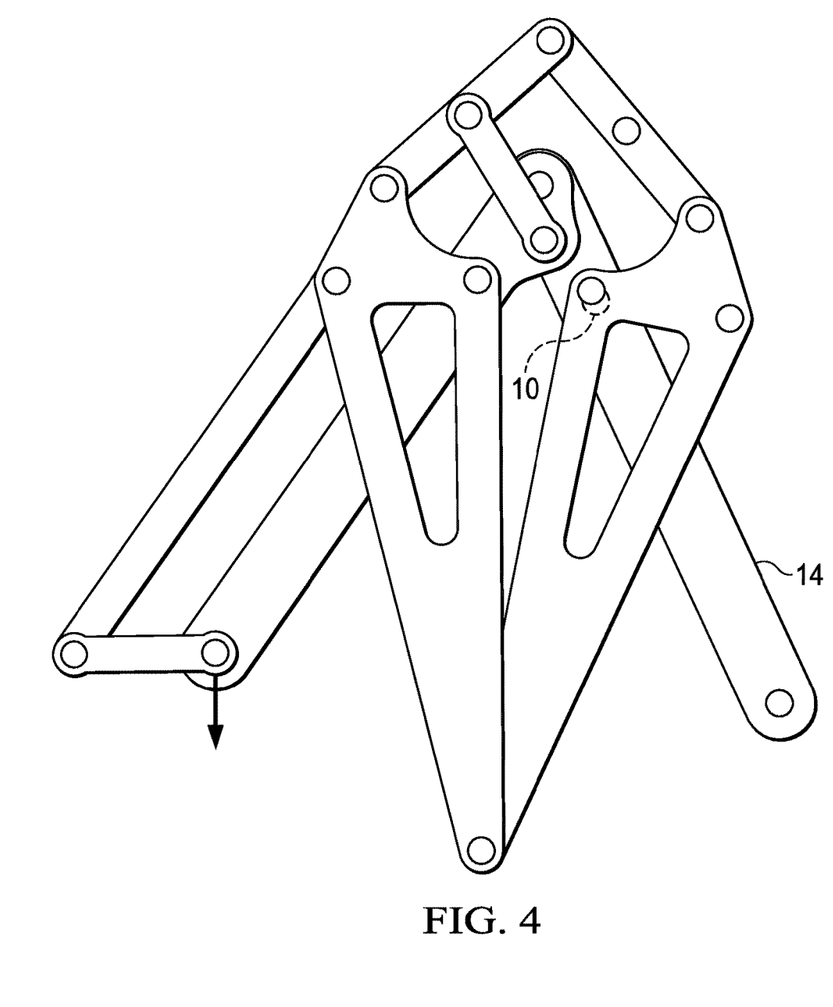

FIG. 3 now shows that, preferably at least substantially symmetrically, a gear mechanism lever 17 and a coupling unit 15 are connected in an articulated manner to the respective counter-pieces and that as a consequence, FIG. 4 shows this, a second steering rod 14 is also provided. So that the kinematic system is not over-determined, it is advantageous in this instance with this second steering rod 14 to construct the connection which corresponds to the upper articulation location of the second four-bar linkage or articulated parallelogram (only illustrated in FIG. 5) as an elongate hole 10 or to counteract such an overdetermination and consequently tension in a different manner or at another location by means of an appropriate measure.

Figure 5:
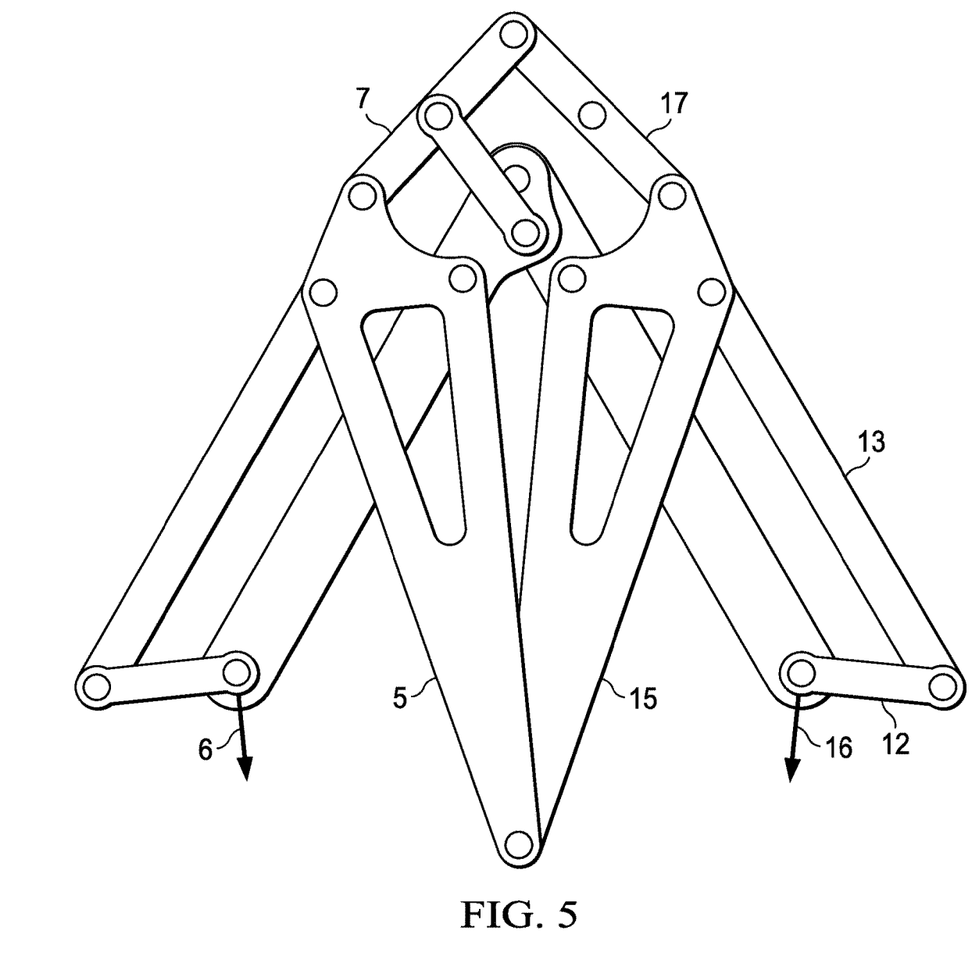

FIG. 5 finally shows the complete connection, in a similar manner to the guiding rod 3 a second guiding rod 13 was provided and the object carrier 12 of the second four-bar linkage 11 which corresponds to the base 2 carries out the movement about the virtual axis whose position is determined by the intersection of the two arrows 6, 16.

Figure 6:
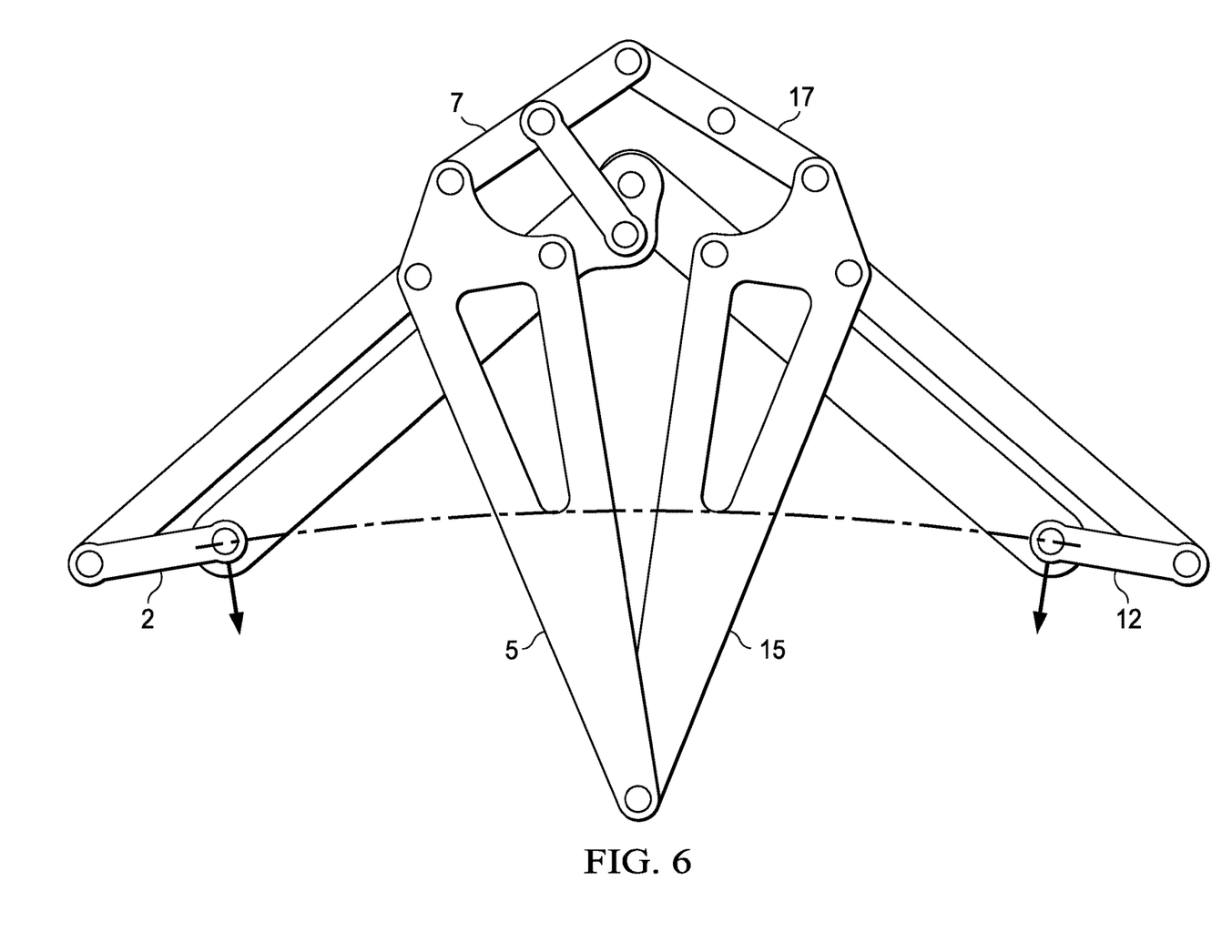
FIGS. 6 and 7 show the small spatial requirement of the kinematic system of FIGS. 1 to 5 in relation to the pivot radius which can be achieved.

FIG. 6 is a view similar to that of FIG. 5 but in another position of the kinematic system in order to demonstrate the great movability thereof with a small spatial requirement, measured at the radius.

Figure 7:
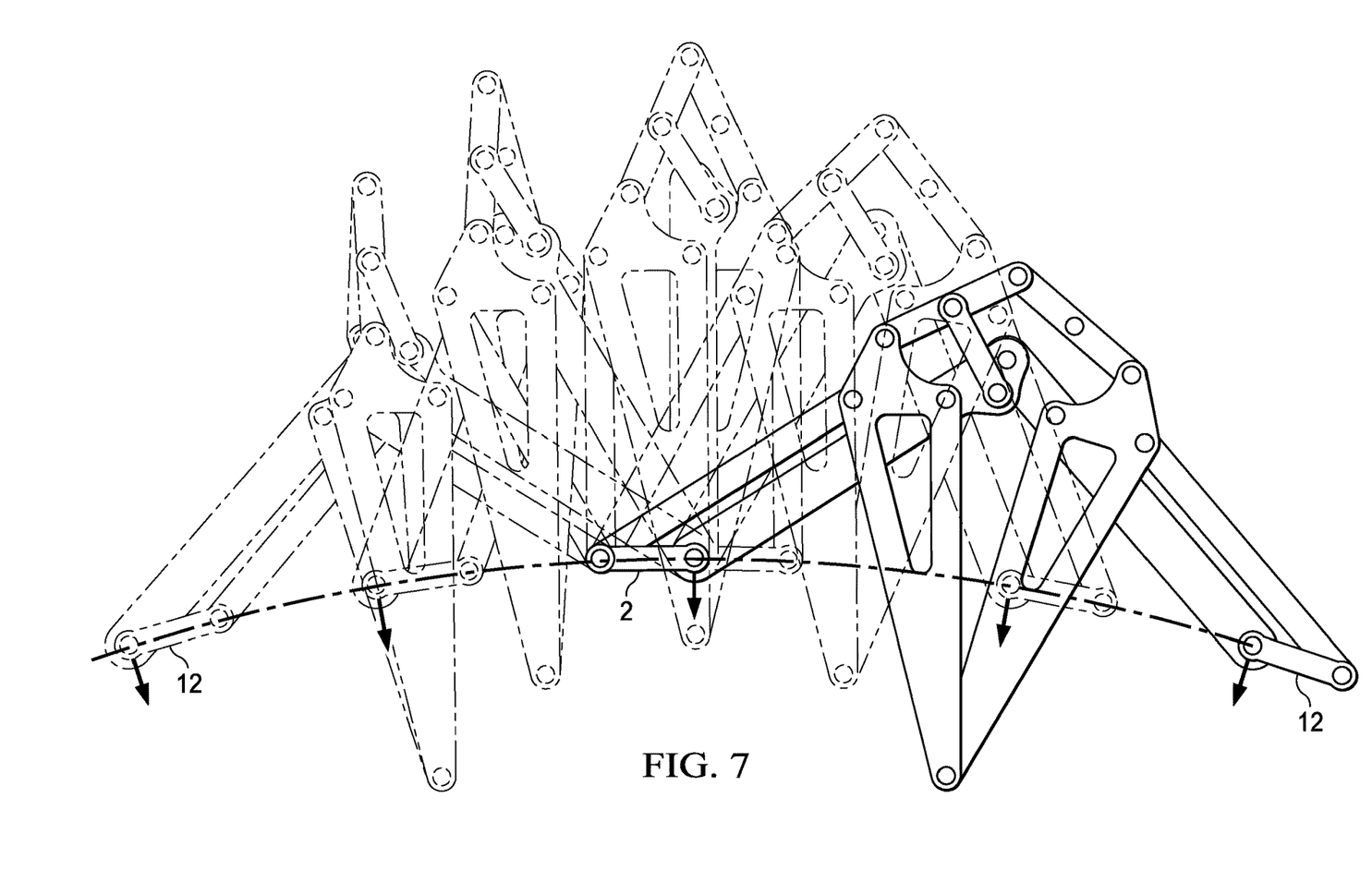

FIG. 7 now shows with a fixed base 2 the different positions of the object carrier 12 with the prerequisite that the kinematic system is constructed in a "passing" manner, that is to say, the individual components can move past each other when the base and the object carrier are superimposed. This can be achieved by means of corresponding staggering in the direction normal with respect to the drawing plane.

Figure 8:
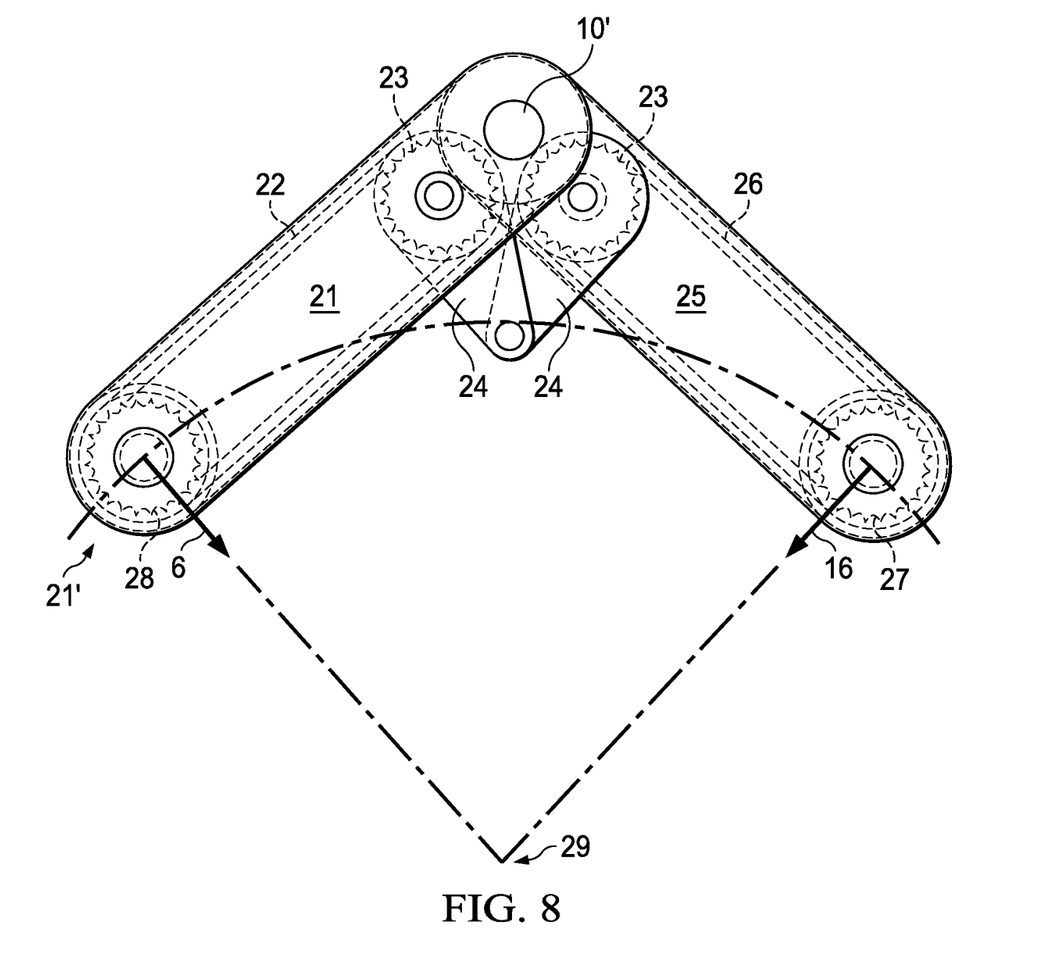
FIGS. 8 and 9 show the two embodiments beside each other.

FIG. 8 shows a second embodiment of the device according to the invention which is kinematically equivalent to the first embodiment and in which the coupling of the two rotary arms 21, 25 which constitute the rotary components is carried out by means of flexible pulling means 22, 26, such as cables, chains, bands, toothed belts, or the like, and cooperating toothed wheels or friction wheels and chain wheels or rollers, the base roller 28, the coupling rollers 23 and the object roller 27 which are constructed at least in segments and via gear mechanism levers 24 which are secured in the angular position thereof and which are constructed as plates as a result of the loading.

A pulling means 22 is provided on or in a first rotary arm 21, extending around a base roller 28. The base roller 28 does not also rotate when the rotary arm is pivoted about the fixed pivot axis 21' thereof and consequently forms the actual base. Via a coupling roller 23 to which a gear lever 24 is connected in a rotationally secure manner, another gear mechanism lever 24 of a second rotary arm 25 is rotated. The two rotary arms 22, 25 are in this instance connected to each other in an articulated manner by means of a common rotation axis 10'. As a result of a similar, where applicable even symmetrical construction with respect to the first rotary arm, using a pulling means 26 in the second rotary arm 25 an object roller 27 carrying the object which is intended to be rotated is rotated about the virtual axis 29, as indicated by the arrows 6, 16.

It can be clearly seen that, with different diameters of the base roller and coupling roller and/or coupling roller and object roller, changed pivot angles of the second rotary arm and/or the object roller are achieved so that, as a result of this simple measure, a significant influence can be applied to the pivot movement of the object roller 27, and that consequently the virtual axis under some circumstances is not fixed with respect to the base.

Figure 9:
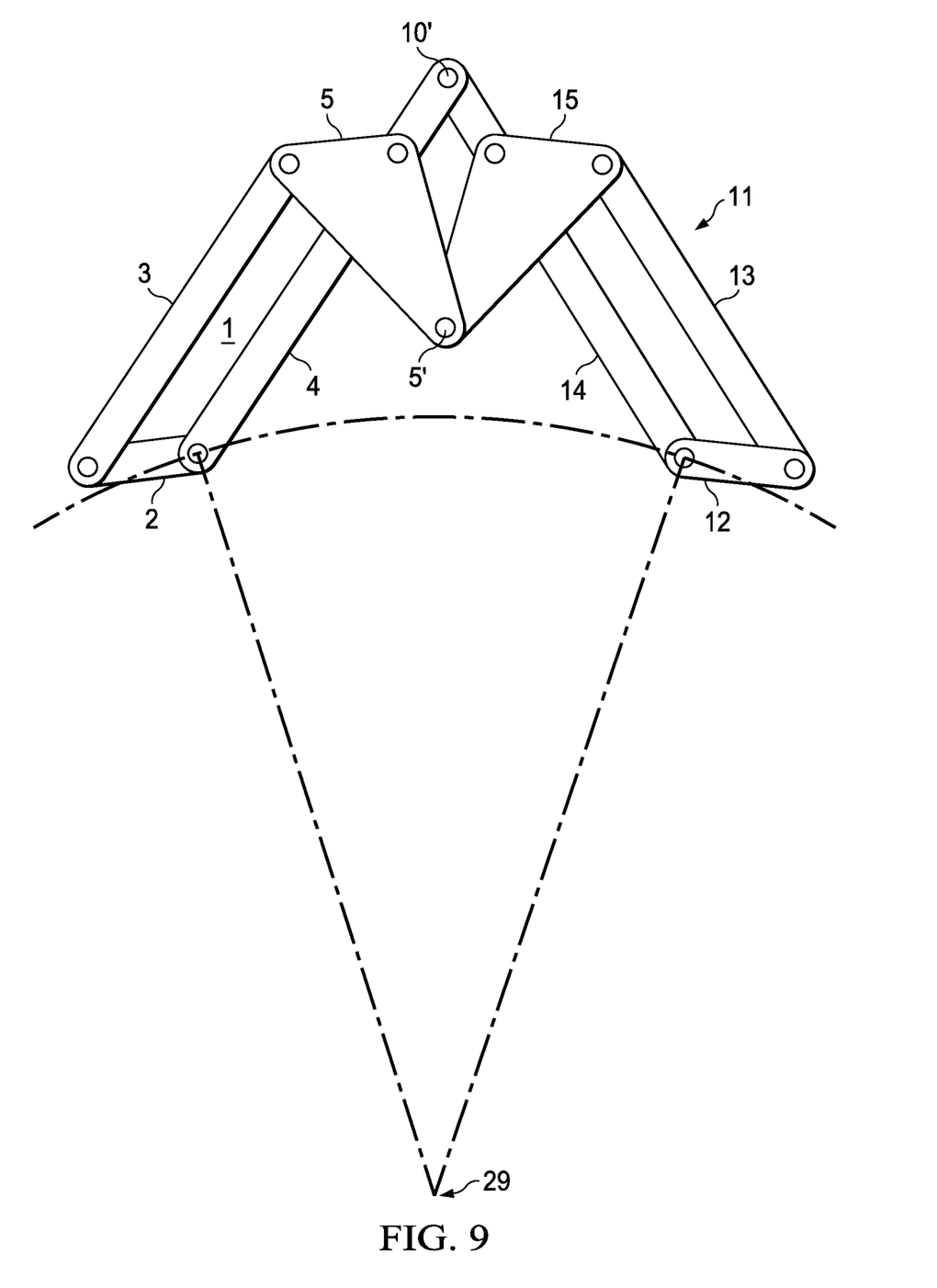

FIG. 9 shows the similar basic construction of the first embodiment in which the coupling gear mechanism comprises the rotatable connection of the extensions of the two steering rods 4, 14 and the rotatable connection of the angled and, as a result of the loading, plate-like extensions of the two couplers 5, 15. In this instance, by means of correspondingly non-symmetrical construction, the influence explained in FIG. 8 on the virtual axis can also be achieved.

Figure 10:
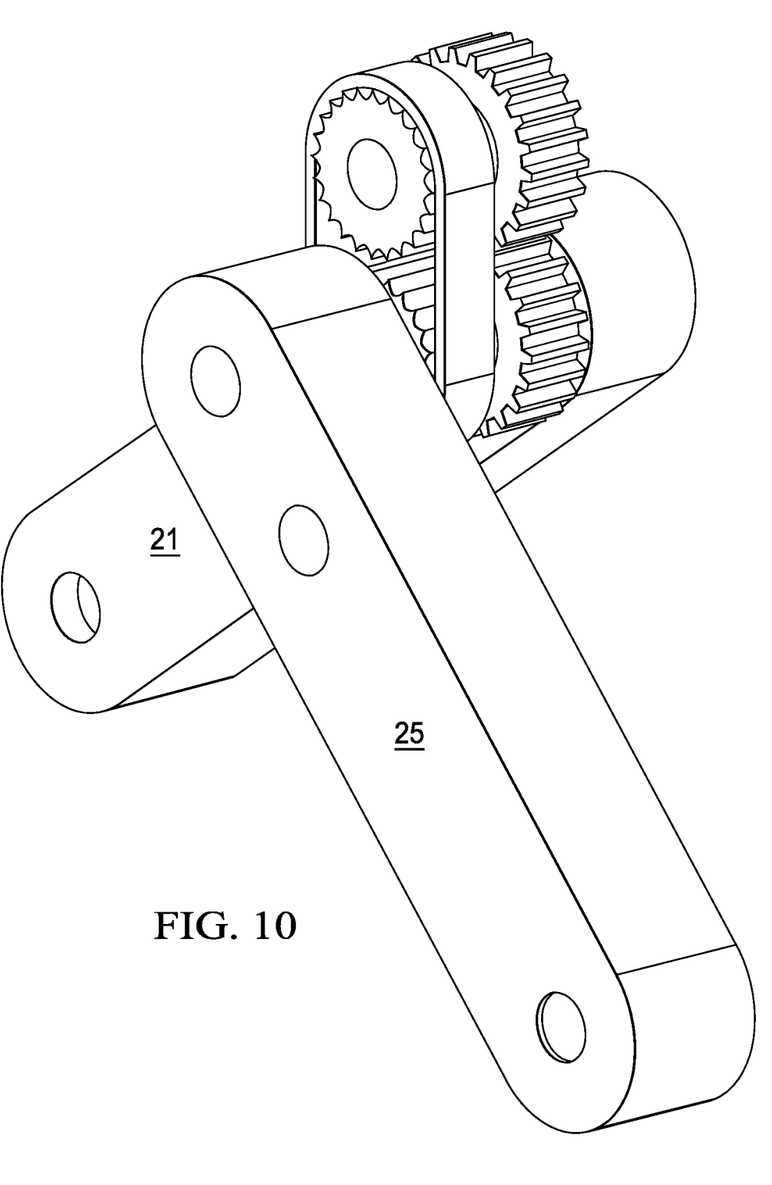
FIGS. 10 and 11 show the second embodiment in detail.
Figure 11:
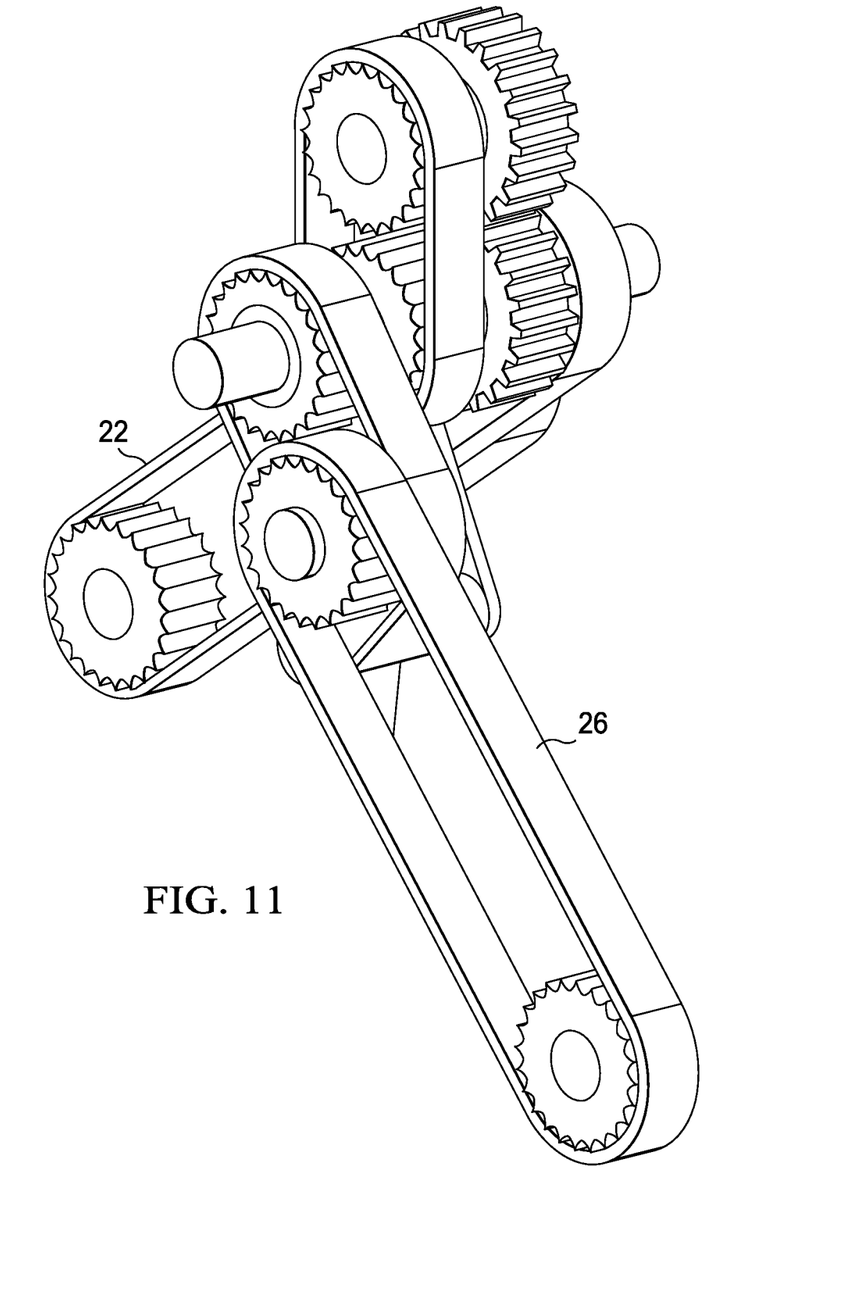
Figure 12:
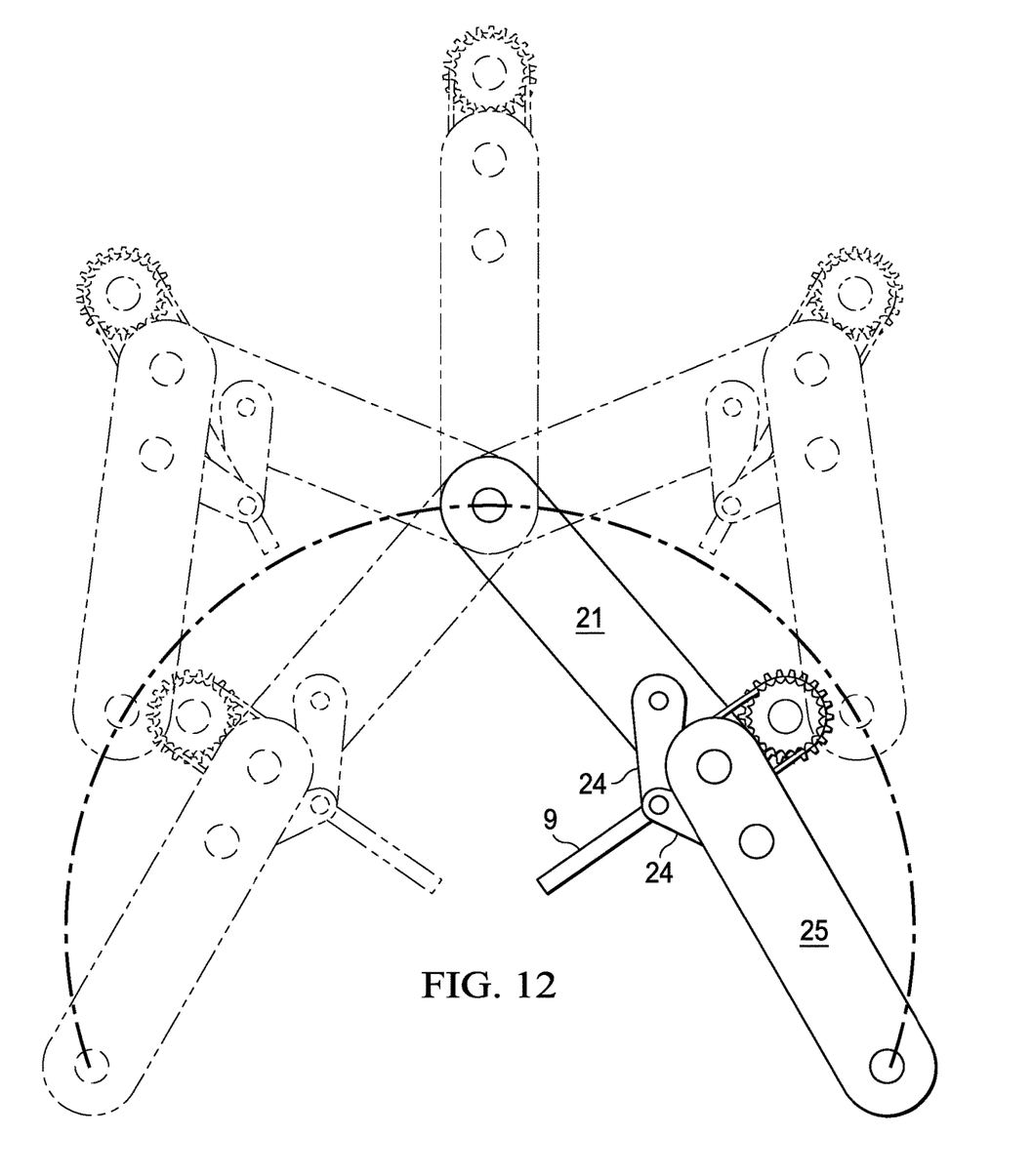
FIG. 12 shows a second embodiment in different positions.

FIGS. 10 to 12 show a "passing" embodiment and the great pivot range which can be achieved and which cannot be achieved by any previously known kinematic system. In this instance, as a result of a symmetry retainer 9 which is displaceably connected, on the one hand, to the connection axis of the two gear mechanism levers 24 and which, on the other hand, is guided by the toothed wheel/toothed belt gear mechanism between the two rotary arms 21, 25, the passage through the singularity is enabled when the rotary arms are in alignment.

FIGS. 10 and 11 are a perspective view of the "staggering" normal with respect to the drawing plane which is required for this purpose. FIG. 12 shows the extraordinarily large pivot angle which can be achieved.

As can be seen in comparison with the two embodiments, the individual components rotary arm/four-bar linkage correspond to each other completely, the coupling of these two elements can be carried out in extremely different manners, in the embodiments shown, without being limited thereto, suitable elements were selected: pulling means and toothed wheels, on the one hand, a lever gear mechanism in the other application. A replacement or a combination is naturally possible.

Figure 13:
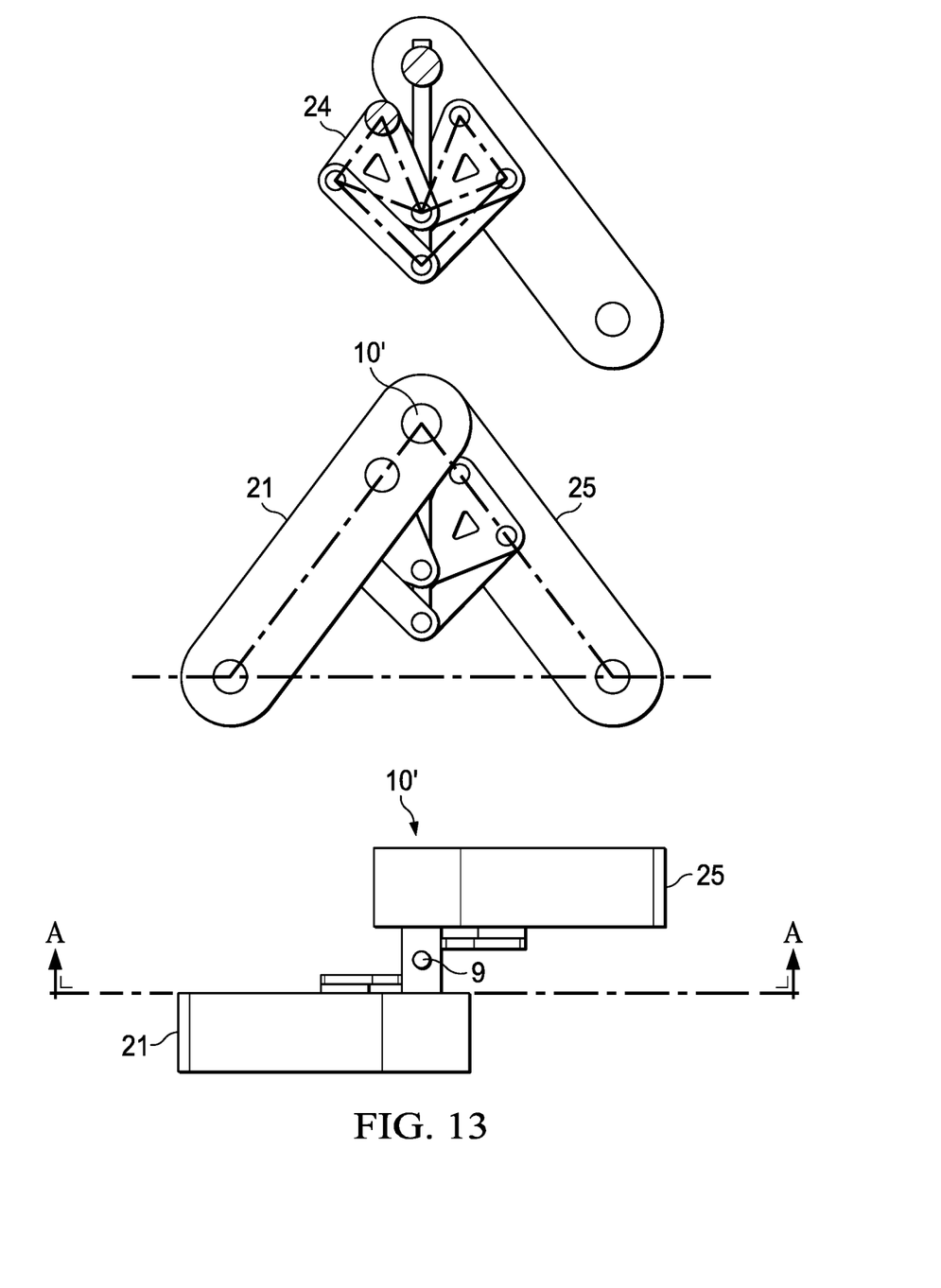
FIGS. 13 and 14 show the second embodiment as different depictions with the mechanism for controlled passage through the singularity.
Figure 14:
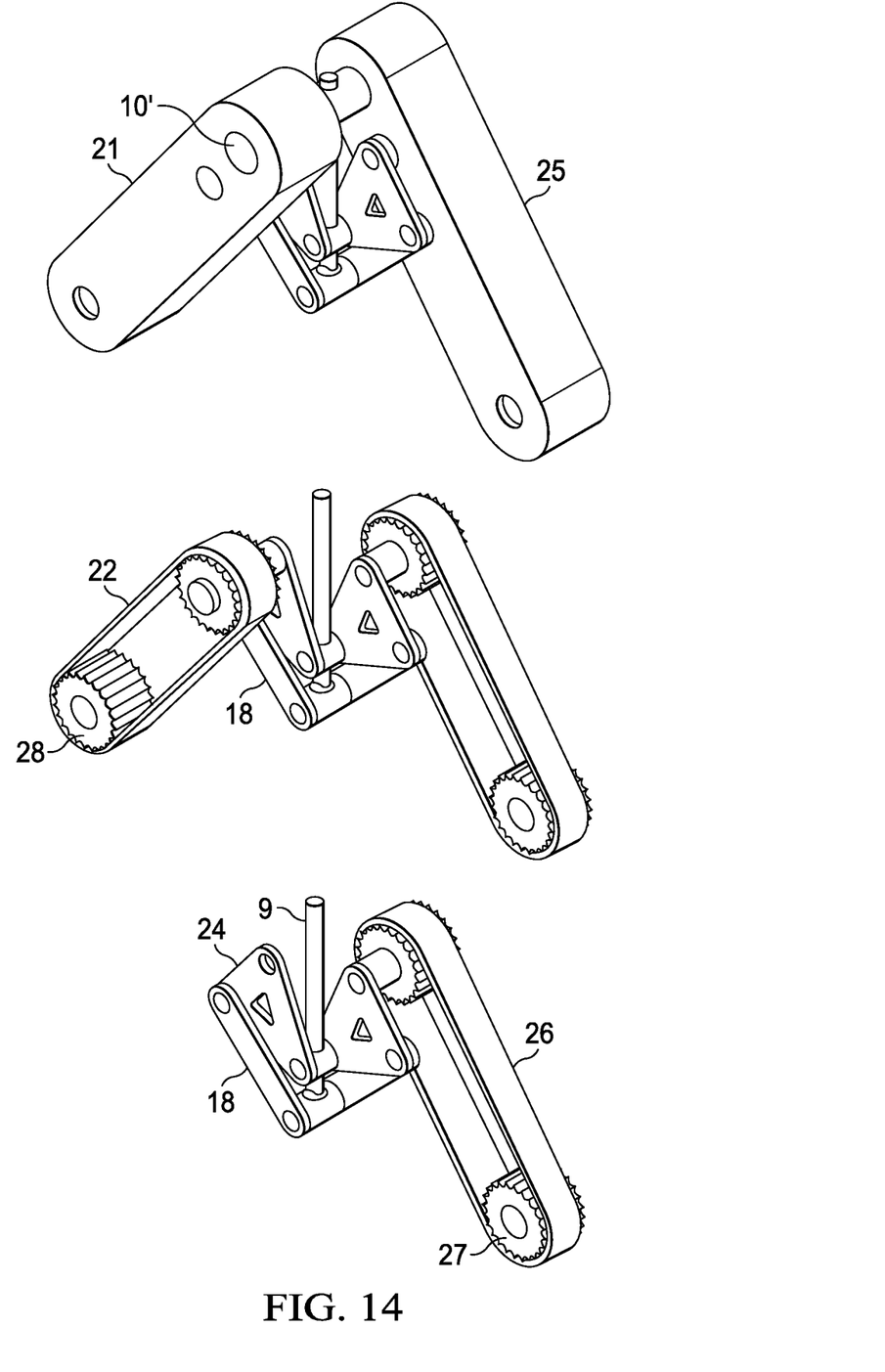
Figure 15:
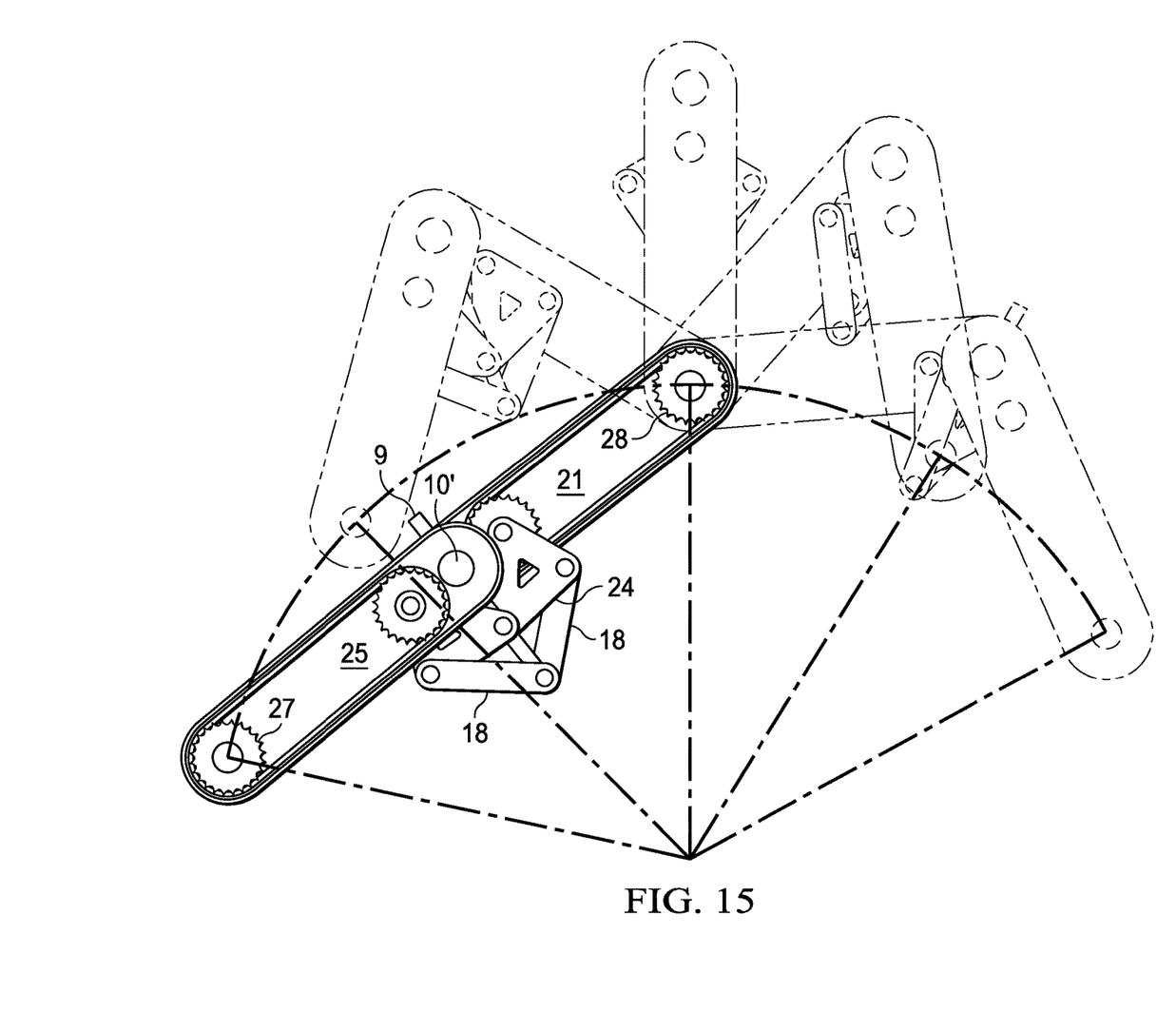
FIG. 15 shows the second embodiment in different positions as far as the singularity.

FIGS. 13 to 15 show, partially as several views, an embodiment in which the symmetry retainer 9 is fixed in its position via the gear mechanism levers 24 which are connected in an articulated manner to the rotary arms 21, 25 and which are fixed in their angular position by means of the coupling rollers 23 and which are formed as plates and which are connected to each other in an articulated manner, and via which retention rods 18 which are connected in an articulated manner to the gear mechanism levers 24 and to each other, and finally via the displaceable connection to the center axis 10' which connects the two rotary arms, and thus also fixes the components mentioned in the position thereof. This and the staggering of the individual components which can be seen particularly clearly in FIG. 14 enables the passing through the singularity.

It is not necessary in any of the embodiments shown to maintain the symmetry shown in this instance, with knowledge of the invention the person skilled in the art can carry out numerous changes and adaptations to the peripheral conditions predetermined for him. It is thus particularly also possible to combine the two embodiments since the two rotary components are connected only by means of the coupling components thereof.

The actual implementation may use depending on the application field and the foreseeable loading on the extremely different materials: steel, in particular stainless steel, aluminum and also plastics material are first considered. The sizing of the bearings and where applicable the selection of the pulling means does not present a problem with knowledge of the invention.

Application fields which may be considered include all objects which can be pivoted relative to each other and in particular the cases set out in the prior art mentioned, particular mention should be made in this instance only of rocking chairs, including for retirement homes, training devices for health and fitness sectors; seats for passenger and luxury ships as inclination compensation; baby cradles with rocking action; kinematic system for beds for minimally invasive operations in hospital; lounge chairs with rocking movement; stools, massage chairs; rocking couches; in each case for the seat face and/or the backrest; rocking beds particularly in retirement homes and hospitals to counteract bedsores, but also for better sleeping; sofas; seating furniture for public spaces such as waiting areas for buses, airports, railway stations, etcetera; but also for: swings; toys; manipulators; simulators; physiotherapy devices; items of seating furniture; seats in vehicles (car, aircraft, bus, train, etc.), patient beds; pivotable milling heads, tool carriers, in particular for water cutting devices, paint spraying installations, laser tools, remote-controlled water jet directing devices for fire fighting, etcetera.

LIST OF REFERENCE NUMERALS (NUMBERS WITH "'" REFER TO AXES AND ARE NOT SET OUT SEPARATELY)

1 First four-bar linkage
2 Base
3 First guiding rod
4 First steering rod
5 First coupling component
6 First arrow to the axis
7 First gear mechanism lever
8 Connection rod
9 Symmetry retainer
10 Elongate hole
11 Second four-bar linkage
12 Object carrier
13 Second guiding rod
14 Second steering rod
15 Second coupling component
16 Second arrow to the axis
17 Second gear mechanism lever
18 Retention rod
19 Rotational arrow
20 Empty
21 First rotary arm
22 First pulling means
23 Coupling roller
24 Gear mechanism lever
25 Second rotary arm
26 Second pulling means
27 Object roller
28 Base roller
29 Virtual axis

What is claimed:

1. A device having a kinematic system for pivoting an object about a virtual axis, the kinematic system comprising:
   a base that rotatably supports a first rotary component;
     where the first rotary component includes a first coupling component that is rotatable relative to the base, but the first coupling component does not rotate with the first rotary component relative to the base; and
   a second rotary component that supports a carrier for the object;
     the second rotary component includes a second coupling component that is rotationally coupled to the object, but the second coupling component does not rotate with the second rotary component relative to the object;
   wherein the second rotary component is connected to the first rotary component via a pivotal connection between the first and second coupling components such that when the object carrier is moved relative to the base the object carrier is rotated about the virtual axis.

2. The device of claim 1, wherein the first rotary component includes a four-bar linkage that includes:
   a side corresponding to the base;
   a first guiding rod that is pivotably articulated to the base;
   a first steering rod that is pivotably articulated to the base; and
   the first coupling component that pivotably connects to both the first guiding rod and the first steering rod;
   wherein the second rotary component includes a second four-bar linkage that includes:

a side corresponding to the object carrier;
a second guiding rod that is pivotably articulated to the object carrier;
a second steering rod that is pivotably articulated to the object carrier; and
the second coupling component that pivotably connects to both the second guiding rod and the second steering rod;
such that the two four-bar linkages can be pivoted relative to each other by means of the pivotal connection between the first and second coupling components.

3. The device of claim 2, wherein at least one of the two four-bar linkages is an articulated parallelogram.

4. The device of claim 2, wherein the first and second coupling components are either extended in a bent-off direction or are constructed as plates, further comprising a coupling gear mechanism that includes an articulated connection between an extension of the first steering rod and an extension of the second steering rod, and the pivotal connection between the first and second coupling components.

5. The device according to claim 4, further comprising:
a first gear mechanism lever that engages in an articulated manner with the first coupling component;
a second gear mechanism lever that engages in an articulated manner with the second coupling component;
wherein the first and second gear mechanism levers are connected to each other in an articulated manner; and
one of the first and second gear mechanism levers further includes a connection rod that connects the gear mechanism lever to the steering rod of its associated four-bar linkage, wherein the connection rod is rotatably articulated at both ends.

6. The device of claim 1, wherein
the base includes a fixed roller;
the object carrier includes an object roller;
the first rotary component includes a first rotary arm, a first coupling roller connected to a first gear mechanism lever in a rotationally secure manner, and a first pulling means wrapping around the fixed base roller and the first coupling roller;
the second rotary component includes a second rotary arm, a second coupling roller connected to a second gear mechanism lever in a rotationally secure manner, and a second pulling means wrapping around the second coupling roller and the object roller, where the object roller is rotatably supported in the second rotary arm.

7. The device of claim 6, wherein the first and second pulling means are independently selected from cables, chains, bands, and toothed belts; and the base roller, coupling rollers and object roller are configured to cooperate with the respective pulling means.

8. The device of claim 1, wherein the virtual axis is fixed with respect to the base.

9. The device of claim 1, further comprising a tool or a furniture item that is fitted to the object carrier.

10. The device of claim 1, wherein the first coupling component does not rotate with respect to the first rotary component.

* * * * *